United States Patent
Sonohara et al.

(10) Patent No.: US 7,635,935 B2
(45) Date of Patent: Dec. 22, 2009

(54) MOTOR

(75) Inventors: Hiroyuki Sonohara, Nagano (JP); Takeyoshi Miyashita, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 11/726,287

(22) Filed: Mar. 21, 2007

(65) Prior Publication Data

US 2007/0222313 A1    Sep. 27, 2007

(30) Foreign Application Priority Data

Mar. 22, 2006    (JP)    ............................. 2006-078530

(51) Int. Cl.
    *H02K 5/16*    (2006.01)
(52) U.S. Cl. .................. 310/90; 310/89; 310/49 R; 310/40 MM; 310/91
(58) Field of Classification Search .................. 310/90, 310/91, 92, 40 MM, 43, 49 R, 89
    See application file for complete search history.

(56) References Cited

U.S. PATENT DOCUMENTS

| | | | | |
|---|---|---|---|---|
| 3,823,336 | A * | 7/1974 | Nakamura et al. | 313/405 |
| 6,060,807 | A * | 5/2000 | Saito et al. | 310/91 |
| 6,541,886 | B2 * | 4/2003 | Mayumi | 310/91 |
| 6,700,261 | B2 * | 3/2004 | Mayumi | 310/91 |
| 6,825,587 | B2 * | 11/2004 | Yajima et al. | 310/90 |
| 7,095,148 | B2 * | 8/2006 | Mayumi | 310/90 |
| 2002/0024265 | A1 * | 2/2002 | Mayumi | 310/179 |
| 2004/0104633 | A1 * | 6/2004 | Nishimura et al. | 310/89 |
| 2005/0285473 | A1 * | 12/2005 | Kobayashi | 310/261 |
| 2006/0028078 | A1 * | 2/2006 | Agematsu | 310/90 |
| 2006/0108885 | A1 * | 5/2006 | Nishimura | 310/90 |
| 2006/0202587 | A1 * | 9/2006 | Agematsu | 310/257 |

FOREIGN PATENT DOCUMENTS

| | | | |
|---|---|---|---|
| JP | 03060347 A * | 3/1991 | |
| JP | 2002-191150 | 7/2002 | |
| JP | 2006226771 A * | 8/2006 | |

* cited by examiner

*Primary Examiner*—Quyen Leung
*Assistant Examiner*—John K Kim
(74) *Attorney, Agent, or Firm*—Cantor Colburn LLP

(57) ABSTRACT

A motor may include a bearing made of resin for rotatably supporting one end part of the rotor shaft, and an urging member attached to a bearing holder and abutted with a pressurization face of the bearing to urge the bearing toward a side of the rotor shaft. A molding material injection gate trace (projection) which has been used when the bearing is resin-molded is positioned at a center portion of the pressurization face. The molding material injection gate trace may be positioned in a recessed part which is formed at a roughly center portion of the pressurization face of the bearing. Further, the urging member may include an urging piece which is formed by cutting a center portion of a metal plate in a ring shape and an opening part is formed in the urging piece.

10 Claims, 8 Drawing Sheets

MOTOR

CROSS REFERENCE TO RELATED APPLICATION

The present invention claims priority under 35 U.S.C. §119 to Japanese Application No. 2006-78530 filed Mar. 22, 2006, which is incorporated herein by reference.

FIELD OF THE INVENTION

An embodiment of the present invention may relate to a motor. More specifically, an embodiment of the present invention may relate to a structure of a bearing for supporting a shaft end of a rotor shaft and/or an urging member for urging the bearing to the rotor shaft.

BACKGROUND OF THE INVENTION

Figure 9:
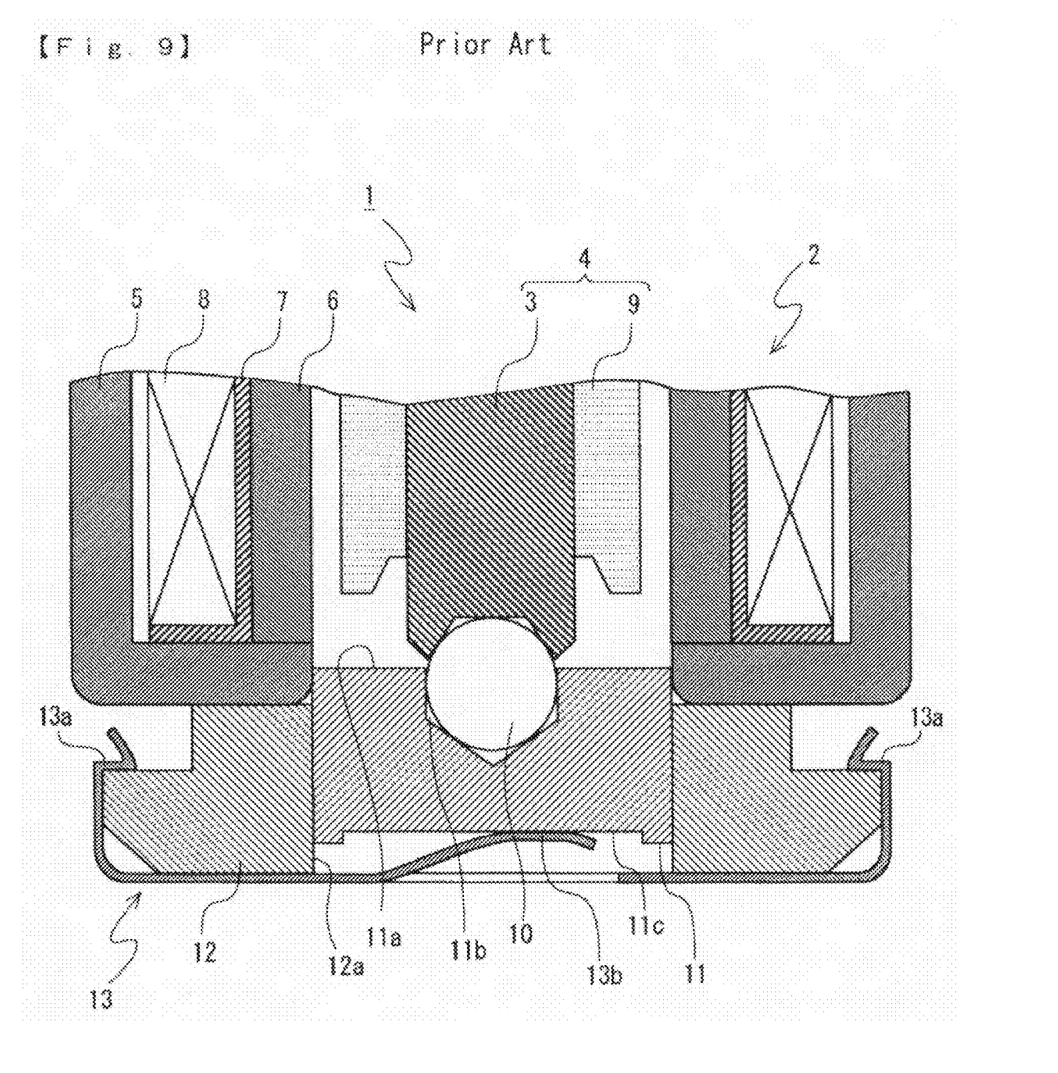
FIG. 9 is an enlarged cross-sectional view showing a part of a conventional motor.

A conventional stepping motor 1, for example, as shown in FIG. 9 which is used for driving a lens in a digital camera, a digital video camera and the like has been known.

The motor 1 shown in FIG. 9 includes a stator 2 and a rotor 4 which is disposed on an inner side of the stator 2 and provided with a rotor shaft 3.

The stator 2 holds a bobbin 7 with an outer yoke 5 and an inner yoke 6. A winding wire 8 is wound around the bobbin 7.

A rotor magnet 9 is fixed to the rotor shaft 3 and one end of the rotor shaft 3 (the other end is not shown) is supported by a bearing 11 through a ball 10.

The bearing 11 is made of resin and a recessed part 11b for holding the ball 10 is formed in a rotor shaft support face 11a located on the rotor shaft 3 side. The bearing 11 is fitted into a hole 12a of a cap part 12 made of resin which is fixed to the stator 2. In addition, the bearing 11 is urged toward the rotor shaft 3 by a urging member 13 which is disposed on the one end side of the cap part 12 (see, for example, Japanese Patent Laid-Open No. 2002-191150).

Figure 10:
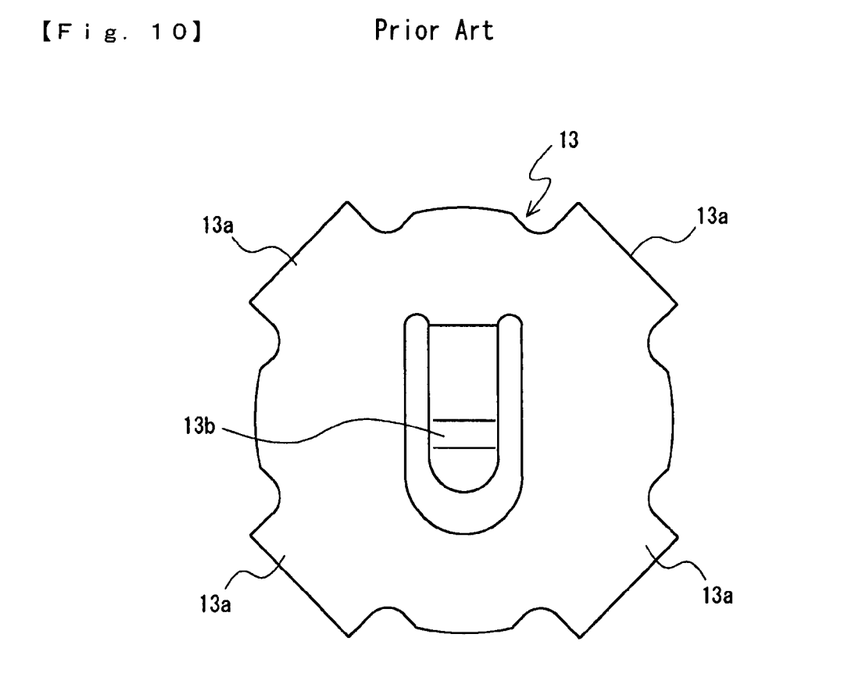
FIG. 10 is a front view showing an urging member used in a conventional motor.

As shown in FIG. 10, a plurality of leg parts 13a (four parts in this embodiment) which is formed by bending a metal plate is formed in the urging member 13. The leg part 13a is, as shown in FIG. 9, engaged with the cap part 12 and held by the cap part 12. Further, a center portion of the urging member 13 is stamped out in a substantially U-shape and an inner side portion is raised or bent and thus an urging piece 13b comprised of an elastic tongue piece is formed in the urging member 13. In addition, a tip end (free end) of the urging piece 13b is bent so as to be elastically abutted with a pressurization face 11c of the bearing 11 to urge the bearing 11 toward the rotor shaft 3 side.

A center portion of the bearing 11 used in such a motor is urged by the urging member 13 and thus it is considered to be preferable that an injection gate trace for injecting resin material when the bearing 11 is resin-molded is not located at the center portion of the bearing 11.

Figure 11:
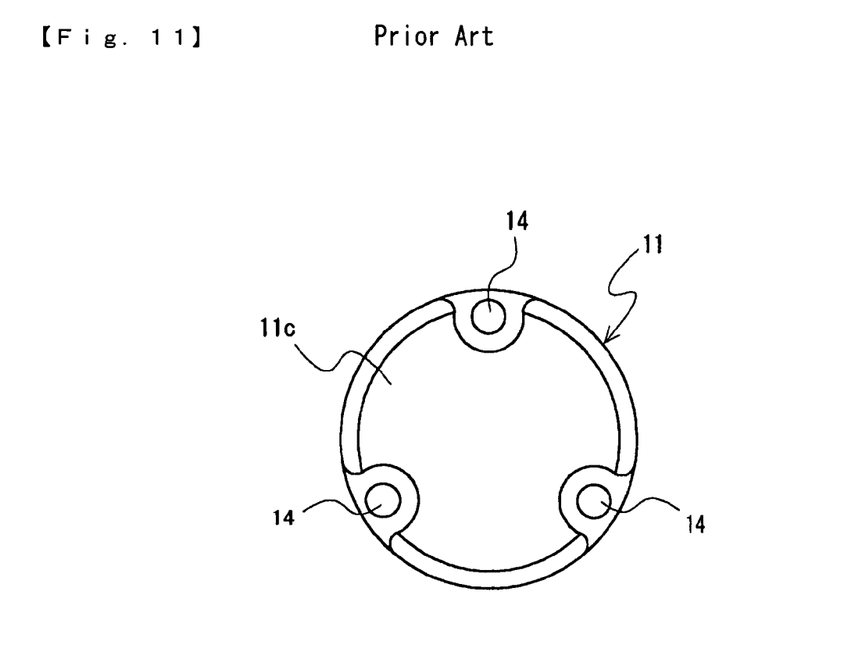
FIG. 11 is a front view showing a bearing used in a conventional motor.

Therefore, when a cylindrical object such as the above-mentioned bearing 11 made of resin is molded, for example, as shown in FIG. 11, it is commonly performed such that resin material is injected from three equally divided positions 14 which are disposed closer to an outer periphery of the bearing 11, or that resin material is injected from an outer periphery of the bearing 11 by using a ring-shaped injection gate.

However, in the case that a cylindrical object made of resin is used as the above-mentioned bearing 11, when its circularity is not precise, the bearing 11 cannot be fitted into the hole 12a of the cap part 12 or a gap space is formed between them. Especially, in the bearing 11 used in a motor in which miniaturization is required, molding precision (circularity) for the bearing 11 greatly affects on rotational accuracy of the rotor shaft.

Moreover, in the case when a ring-shaped injection gate is used, a die structure becomes to be complicated and an extra working for removing an injection gate trace is required and thus its manufacturing cost increases.

Further, the urging piece 13b of the urging member 13 is formed such that a center portion of the urging member 13 comprised of a metal plate is stamped out in a substantially U-shape and its inner side portion is raised and bent.

Therefore, in order to secure an urging width of the urging piece 13b to the bearing 11, a width of the urging piece 13b is required to be broadened. However, when the width of the urging piece 13b is broadened, its rigidity (elastic force) is increased and thus the bearing 11 is urged toward the rotor shaft 3 side with a larger urging force than that is required.

SUMMARY OF THE INVENTION

In view of the problems described above, an embodiment of the present invention may advantageously provide a motor in which a bearing is easily molded and its circularity can be secured.

Further, an embodiment of the present invention may advantageously provide a motor in which a larger abutting width of an urging member to a bearing can be secured and a stable urging force to the bearing can be obtained.

Thus, according to an embodiment of the present invention, there may be provided a motor including a rotor having a rotor shaft to which a permanent magnet is fixed, a stator which is formed with a rotor insertion hole into which the rotor is inserted, a bearing holder which is fixed to one end of the stator and is formed with a bearing hole, a bearing made of resin which is provided in the bearing hole for rotatably supporting one end part of the rotor shaft, and an urging member which is attached to the bearing holder to abut with a pressurization face of the bearing which is an opposite face to a rotor shaft support face of the bearing to urge the bearing toward a side of the rotor shaft. Further, a molding material injection gate trace (projection) which has been left when the bearing is resin-molded is positioned at a center portion of the pressurization face of the bearing.

According to the embodiment of the present invention, the molding material injection gate trace (projection) which has been left when the bearing is resin-molded is positioned at a center portion of the pressurization face of the bearing. Therefore, resin material can be uniformly injected into a die when the bearing is resin-molded and thus a bearing with a high degree of circularity can be easily provided.

In accordance with an embodiment, a recessed part is formed at a roughly center portion of the pressurization face of the bearing so as to concave on a side of the rotor shaft support face of the bearing and the molding material injection gate trace is positioned in the recessed part. In this case, the urging member is prevented from contacting with the molding material injection gate trace.

In accordance with an embodiment, a depth of the recessed part is set to be in a dimension so that a tip end of the molding material injection gate trace does not protrude from the pressurization face. In this case, the urging member is further surely prevented from contacting with the molding material injection gate trace.

In accordance with an embodiment, a spherical supported face is provided at an end part of the rotor shaft and a support recessed part which engages with the spherical supported face of the rotor shaft is formed in the rotor shaft support face. In this case, the rotor shaft can be stably supported.

In accordance with an embodiment, the urging member is provided with an elastic urging piece which is formed of a part of a metal plate that is cut and bent, and a tip end portion of the urging piece is abutted with the pressurization face at a position apart from the recessed part to urge the bearing. In this case, the urging piece can urge the bearing without the urging piece contacting with the molding material injection gate trace.

In accordance with an embodiment, the urging piece is structured by a center portion of the metal plate which is cut in a ring shape and bent and an opening part is formed at a portion of the urging piece where the molding material injection gate trace faces. In this case, a pressurization area or an abutting width with the bearing can be easily secured and the bearing is urged without being applied with an excessive urging force and, moreover, the urging piece can be further surely prevented from contacting with the molding material injection gate trace.

In accordance with an embodiment, the tip end portion of the urging piece is bent so as to abut with the pressurization face in a line contact manner. In this case, especially in the case that the urging piece is formed in a circular ring shape, the abutting width for urging the bearing can be secured larger.

Further, according to an embodiment of the present invention, there may be provided a motor including a rotor having a rotor shaft to which a permanent magnet is fixed, a stator which is formed with a rotor insertion hole into which the rotor is inserted, a bearing holder which is fixed to one end of the stator and is formed with a bearing hole, a bearing which is provided in the bearing hole for rotatably supporting one end part of the rotor shaft, and an urging member which is attached to the bearing holder and abutted with a pressurization face of the bearing which is an opposite face to a rotor shaft support face of the bearing to urge the bearing toward a side of the rotor shaft. In this motor, the urging member includes an urging piece which is formed by cutting a center portion of a metal plate in a ring shape and an opening part is formed in the urging piece.

According to the embodiment of the present invention, a pressurization area or an abutting width with the bearing can be easily secured and the bearing is urged without being applied with an excessive urging force. In this case, it is preferable that a tip end side from the opening part which is formed at the center portion of the urging piece is formed as an abutting part for abutting with the pressurization face of the bearing.

In accordance with an embodiment, the tip end portion of the urging piece is bent to abut with the pressurization face in a line contact manner and is abutted with the pressurization face at a position apart from a center of the bearing. In this case, especially in the case that the urging piece is formed in a circular ring shape, the abutting width for urging the bearing can be further secured larger. For example, an abutting width of the abutting part of the urging piece with the pressurization face of the bearing can be made larger than a width of a root part which is a part on a root side from the opening part, i.e., a connecting part of a main body part of the urging member with the urging piece.

In accordance with an embodiment, the bearing is made of resin and a molding material injection gate trace (projection) which has been left when the bearing is resin-molded is positioned at a center portion of the pressurization face. In this case, resin material can be uniformly injected into a die when a bearing is resin-molded and thus a bearing with a high degree of circularity can be easily provided.

In accordance with an embodiment, a recessed part which is formed at a roughly center portion of the pressurization face so as to concave on a side of the rotor shaft support face and the molding material injection gate trace is positioned in the recessed part. In this case, the rotor shaft can be stably supported.

In accordance with an embodiment, a depth of the recessed part is set to be in a dimension so that a tip end of the molding material injection gate trace does not protrude from the pressurization face. In this case, the tip end of the molding material injection gate trace is prevented from protruding from the pressurization face.

In accordance with an embodiment, a spherical supported face is provided in the one end part of the rotor shaft, and a support recessed part is formed in the rotor shaft support face of the bearing to engage with the spherical supported face. In this case, the rotor shaft can be stably supported.

In accordance with an embodiment, the tip end portion of the urging piece is abutted with the pressurization face at a portion apart from the recessed part to urge the bearing. In this case, even when a gap space is occurred between the bearing and the bearing hole, the bearing can be maintained in an inclined state in the bearing hole and thus occurrence of unusual noise due to rattling of the bearing is prevented.

In accordance with an embodiment, the opening part of the urging piece is formed at a position where the opening part faces the molding material injection gate trace. In this case, the urging piece can be prevented from contacting with the molding material injection gate trace.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A motor in accordance with an embodiment of the present invention is applied to a stepping motor provided with a lead screw, which will be described below with reference to the accompanying drawings. The motor in accordance with the present invention is not limited to a stepping motor.

Figure 1:
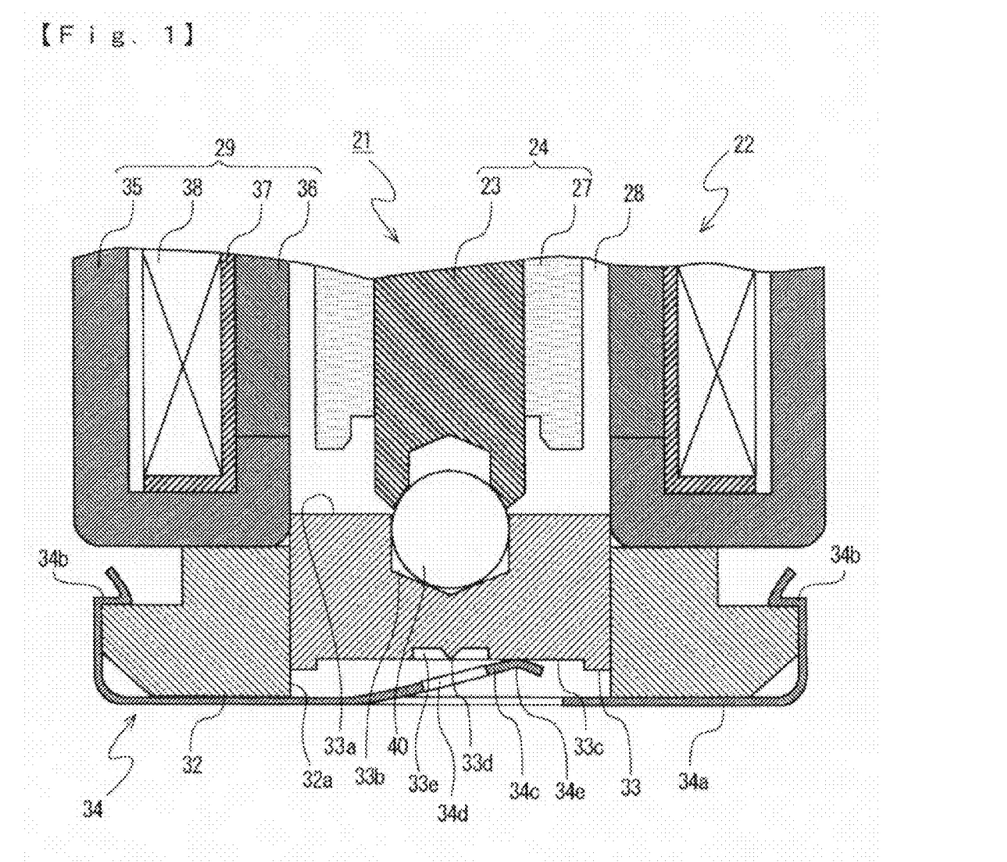
FIG. 1 is an enlarged cross-sectional view showing a part of a motor in accordance with an embodiment of the present invention.
Figure 7:
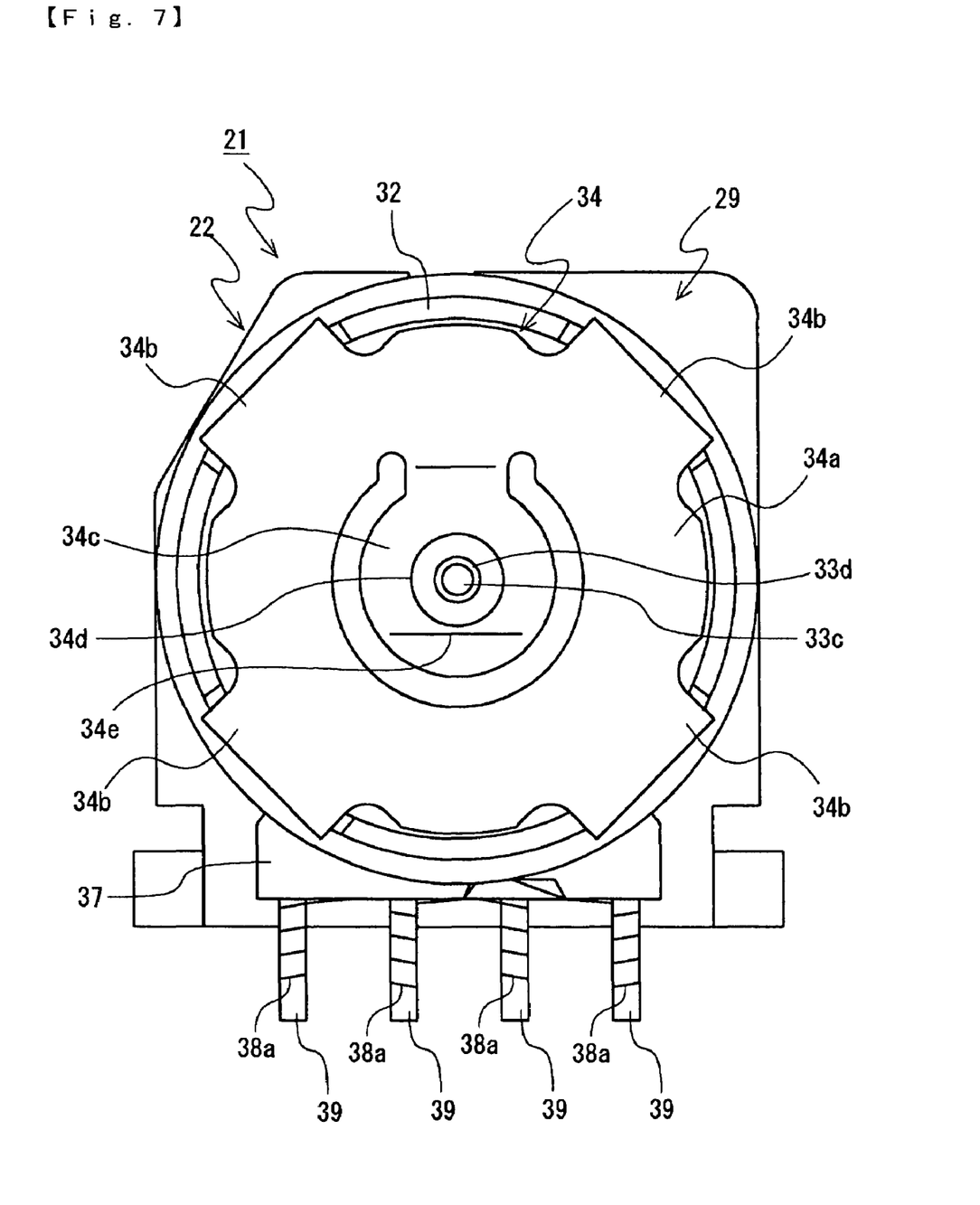
FIG. 7 is a side view showing a motor in accordance with an embodiment of the present invention.
Figure 8:
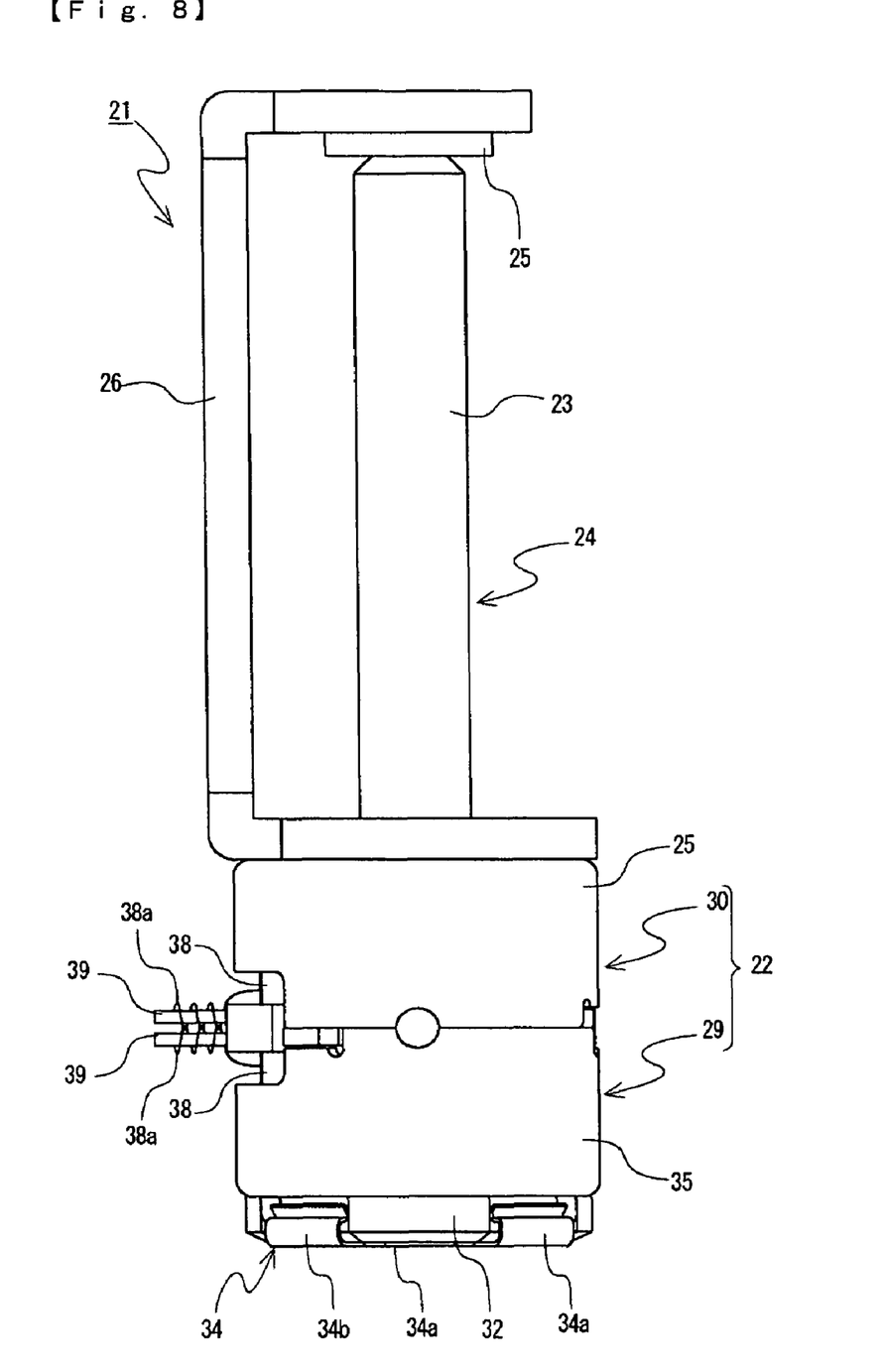
FIG. 8 is a front view showing a motor in accordance with an embodiment of the present invention.

FIG. 7 is a side view showing a stepping motor with a lead screw as a motor in accordance with an embodiment of the present invention. FIG. 8 is a front view showing a stepping motor with a lead screw as a motor in accordance with an embodiment of the present invention. FIG. 1 is a cross-sectional view showing a part of a stepping motor with a lead screw as a motor in accordance with an embodiment of the present invention.

In FIGS. 1, 7 and 8, a motor 21 includes a stator 22, a rotor 24 having a rotor shaft 23 whose one end is held in an inside of the stator 22, and a bracket 26 formed in a "U"-shape in cross section which is fixed to the stator 22 and supports the other end of the rotor shaft 23 through a bearing 25. Both end portions of the rotor shaft 23 are rotatably supported by the bearing 25 and a bearing 33. A lead screw is formed on an outer periphery of the rotor shaft 23.

As shown in FIGS. 1 and 8, the stator 22 is formed in a two-phase structure by using a pair of stator core assemblies 29, 30 in which a rotor insertion hole 28 is formed for inserting a permanent magnet (rotor magnet) 27 fixed to one end of the rotor shaft 23. Further, the stator 22 is provided with a bearing holder 32 which is fixed to the stator core assembly 29 and formed with a bearing hole 32a coaxial with the rotor insertion hole 28, a bearing 33 which is fitted into the bearing hole 32a and rotatably supports one end of the rotor shaft 23, and an urging member 34 which is fitted to the bearing holder 32 and abutted with a pressurization face 33c opposite to a rotor shaft support face 33a of the bearing 33 to urge the bearing 33 to the rotor shaft 23.

The stator core assemblies 29, 30 (only the stator core assembly 29 will be described below) are respectively formed of an outer yoke 35 which structures a part of an outer wall (case) of the stator 22, and an inner yoke 36 which substantially forms the rotor insertion hole 28 and cooperates with the outer yoke 35. Further, the stator core assemblies 29, 30 are respectively provided with a coil bobbin body 37 which is disposed in a hollow part formed by the respective yokes 35 and 36, a coil 38 which is wound around the coil bobbin body 37, and terminal pins 39 which are fixed to the coil bobbin body 37 and protruded to the outside of the outer yoke 35 and around which an end part 38a of the coil 38 is wound.

The bearing holder 32 is fixed to an end face of the outer yoke 35 by using a method of spot welding or the like. In this case, the bearing holder 32 is formed of metal such as sintered metal.

A support recessed part 33b which engages with a ball 40 inserted to one end of the rotor shaft 23 is formed in the rotor shaft support face 33a of the bearing 33.

The rotor 24 is rotated by a magnetic force of the rotor magnet 27 and an electric current flowing through the coil 38.

Figure 2:
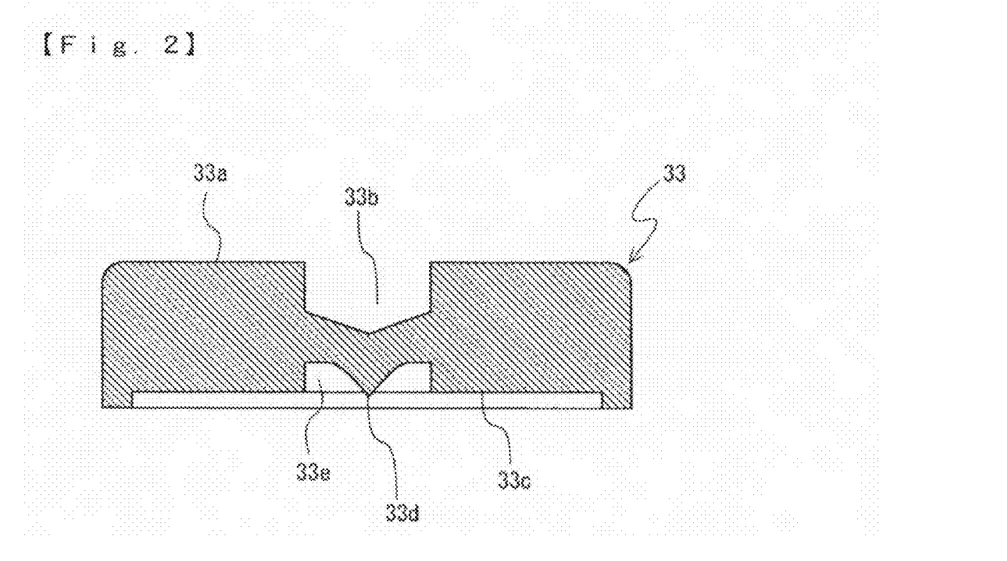
FIG. 2 is a cross-sectional view showing a bearing which is used in a motor in accordance with an embodiment of the present invention.
Figure 3:
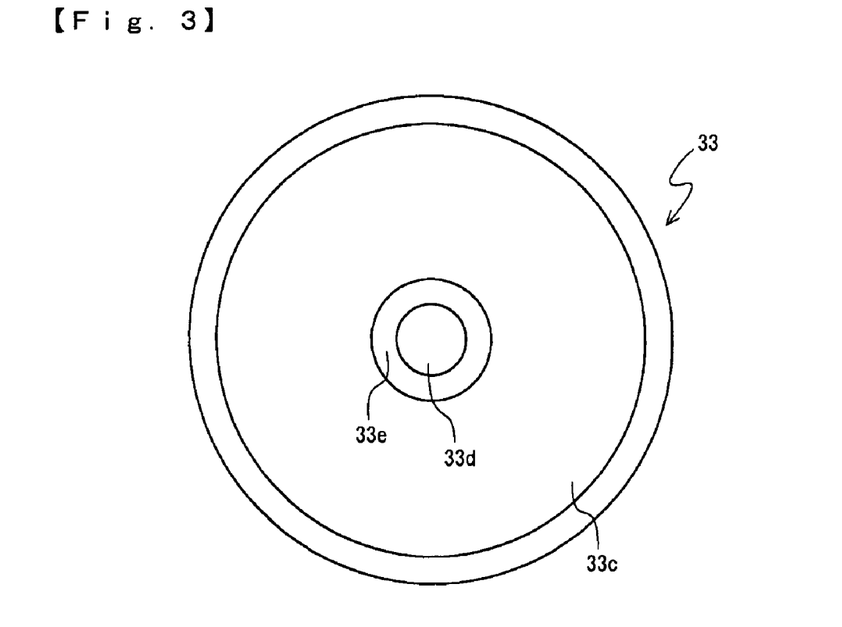
FIG. 3 is a front view showing a bearing which is used in a motor in accordance with an embodiment of the present invention.
Figure 4:
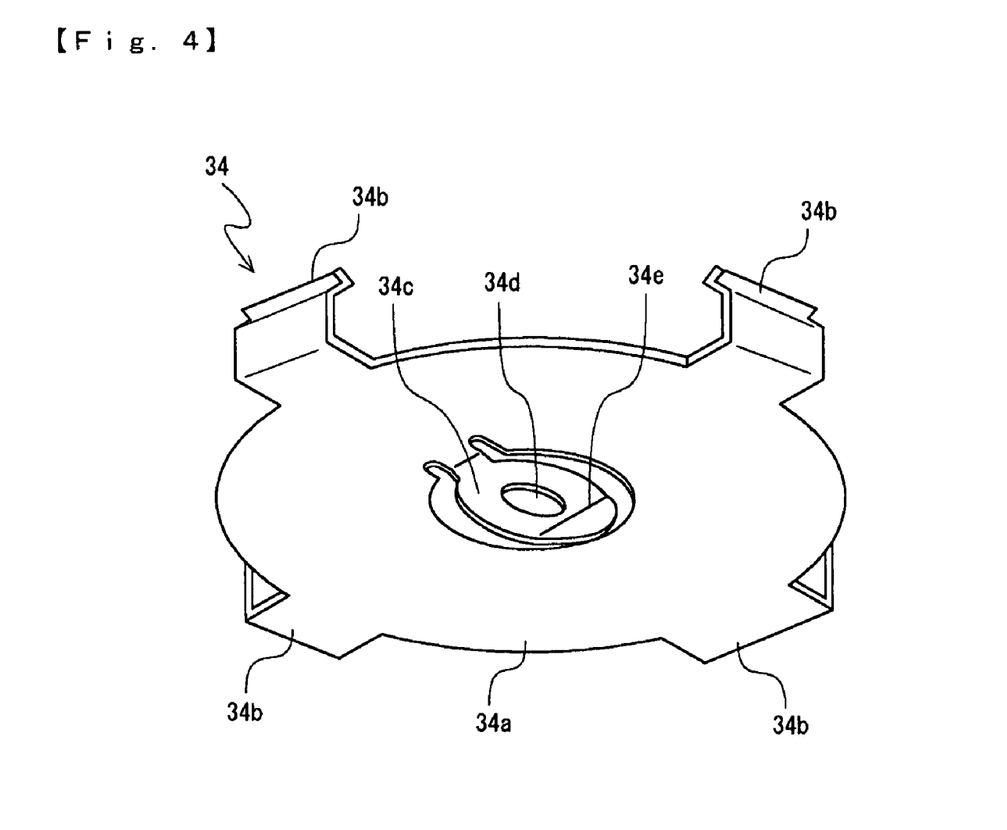
FIG. 4 is an enlarged perspective view showing an urging member which is used in a motor in accordance with an embodiment of the present invention.
Figure 5:
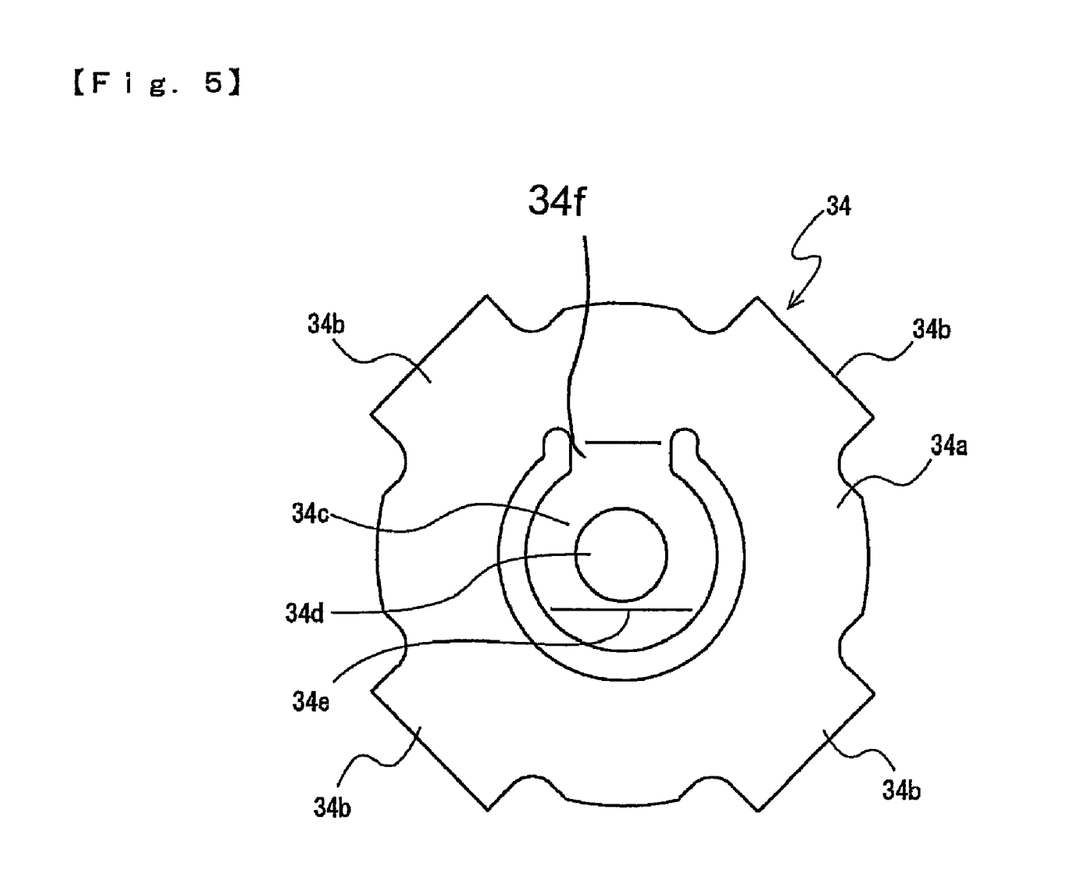
FIG. 5 is a front view showing an urging member which is used in a motor in accordance with an embodiment of the present invention.
Figure 6:
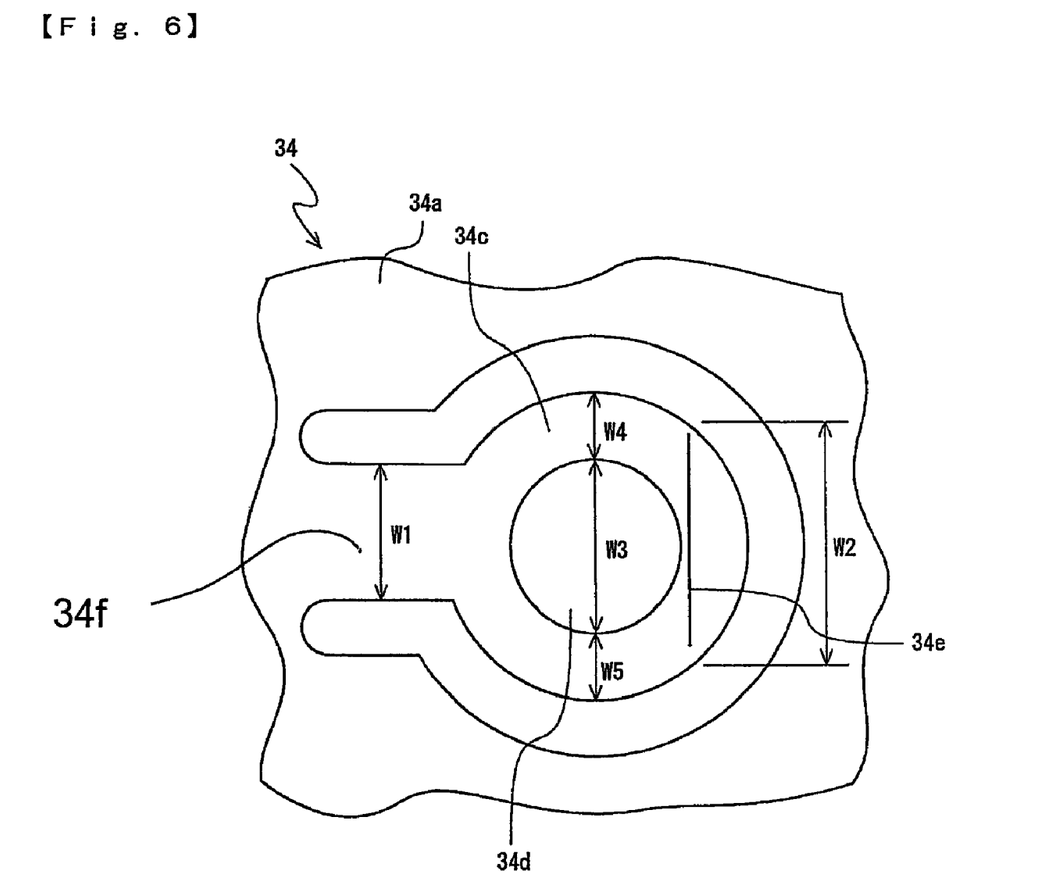
FIG. 6 is a front view showing a part of an urging member which is used in a motor in accordance with an embodiment of the present invention.

FIG. 2 is a cross-sectional view showing a bearing which is used in a motor in accordance with an embodiment of the present invention. FIG. 3 is a front view showing the bearing which is used in a motor in accordance with an embodiment, FIG. 4 is an enlarged perspective view showing an urging member which is used in a motor in accordance with an embodiment, FIG. 5 is a front view showing the urging member which is used in a motor in accordance with an embodiment, and FIG. 6 is a front view showing a part of the urging member which is used in a motor in accordance with an embodiment.

The bearing 33 is made of resin, i.e., the bearing 33 is molded by using polythioethersulfone resin (modified PPE resin), polybutylene telephthalate resin (PBT resin), or resin comprising polythioethersulfone/polyester resin composition including these resins. The bearing 33 is disposed to be movable in the bearing hole 32a along an axial line of the rotor shaft 23. Further, as shown in FIGS. 2 and 3, a molding material injection gate trace (projection) 33d which has been left when the bearing 33 is resin-molded is formed at a center of the pressurization face 33c of the bearing 33. In addition, a recessed part 33e which is formed to be retreated on the rotor shaft support face 33a side from the pressurization face 33c and where the molding material injection gate trace 33d is located is formed at a center of the pressurization face 33c.

The recessed part 33e is preferably set in a depth of that a tip end of the molding material injection gate trace 33 is not protruded from the pressurization face 33c. In this case, the setting of the depth of the recessed part 33e is determined in consideration of a quantity of the injected resin material to the molding die, a size of a nozzle when the bearing 33 is molded, and composition characteristics (hardening characteristic, viscosity or the like) of the resin material.

A bottom face of the support recessed part 33b is formed in a conical face whose apex is positioned at a rotation center (axial line) of the rotor shaft 23, thereby centering of the rotor shaft 23 is performed easily.

As described above, the bearing 33 is manufactured by resin material which is injected from the center position of the bearing 33 into a molding die (not shown) and the molding material injection gate trace 33d may have been left after the injection without performing a deburring work for the molding material injection gate trace 33d.

Moreover, since resin material is injected from the center position of the bearing 33, the bearing 33 can be molded by a small and simple molding die (for example, a gate diameter may be made smaller) and the bearing 33 with a high degree of accuracy (high degree of circularity) is molded and thus variation of filling up of resin material in the whole bearing 33 can be prevented. As an example, in the bearing 33 in accordance with an embodiment of the present invention in which resin material is injected from the center position of the bearing 33, when the bearing 33 was manufactured to be formed with φ3.8 mm, a clearance between the bearing 33 and the bearing hole 32a was 1 μm (on the other hand, in the above-mentioned conventional example, the clearance was 7 μm). According to the embodiment of the present invention, the bearing 33 was inserted into the bearing hole 32a with an extremely small clearance.

In addition, since resin material is injected from the center position of the bearing 33, positioning of a center position of the support recessed part 33b is also easy and, moreover, correctness of positioning is improved and relative positional relationship between the bearing 33 and the rotor shaft 23 can be maintained satisfactory.

In the embodiment described above, the surface of the ball 40 is defined as a spherical shaped supported face which is provided in the one end part of the rotor shaft. However, instead of using the ball 40, one end of the rotor shaft 23 may be performed with a cutting work to form in a spherical shape and the spherical face may be used as a spherical shaped supported face provided in the rotor shaft.

As shown in FIGS. 4 and 5, the urging member 34 is formed with leg parts 34b which are provided at four equally divided positions of an outer peripheral of a disk-shaped plate body 34a so as to be bent toward one side (inside). An urging piece 34c comprised of an elastic tongue piece is formed at a center portion of the plate body 34a by stamping the center portion of the plate body 34a out in a circular ring shape to form a circular groove, and the inside portion of the groove is bent to incline toward the one side to form the urging piece 34c whose outer diameter is larger than a width of a root part 34f which is a connecting part of the plate body 34a with the urging piece 34c. In this embodiment, the urging piece 34c is formed in a circular ring shape whose outer shape is substantially circular but the urging piece 34c may be formed in a non-circular shape such as an elliptical shape or a roughly rectangular shape.

A tip end of the urging piece 34c does not abut with the recessed part 33e but abuts with the pressurization face 33c to urge the bearing 33 toward the rotor shaft 23 side. Further, an opening part 34d is formed at a center portion of the urging piece 34c, i.e., at a center portion of the urging member 34 so as to face the molding material injection gate trace 33d. In this embodiment, the opening part 34d is formed in a circular shape because the outer shape of the urging piece 34c is circular. It is preferable that the opening part 34d is formed in a similar shape to the outer shape of the urging piece 34c for manufacturing but the opening part 34d may be formed in a different shape from the outer shape of the urging piece 34c. In addition, an abutting part 34e which is bent for abutting with the pressurization face 33c in a line contact manner is formed at a tip end of the urging piece 34c.

In accordance with an embodiment, as shown in FIG. 6, a width of a portion provided with the opening part 34d, for example, the width of a portion at a center position of the opening part 34d (W3+W4+W5) is made larger than the width (W1) of the root part 34f of the urging piece 34c which is located on the plate body 34a side with respect to the opening part 34d. Therefore, the abutting width (W2) of the abutting part 34e can be set wider than the width (W1) of the root part 34f. Accordingly, for example, when the width (W1) of the root part 34f of the urging piece 34c is the same as that of the urging piece 13b described in the conventional example, the abutting width (W2) of the abutting part 34e can be set wider than that of the urging piece 13b. Therefore, according to the embodiment of the present invention, the urging piece 34c can urge the bearing 33 more stable than the conventional urging piece 13b. Further, according to the embodiment of the present invention, since the abutting width (W2) can be obtained widely, an abutting width of the abutting part 34e to the pressurization face 33c can be obtained widely and thus the bearing is urged further more stably.

Further, an opening width (W3) of the opening part 34d may be set in that remaining widths (W4) and (W5) of the urging piece 34c are set to be equal to each other and that the sum of the widths (W4) and (W5) is set to be the same as the width (W1). In this case, an urging force of the urging piece 34c may be set to roughly the same as that of the conventional urging piece 13b having the identical width (W1). Therefore, the abutting part 34e can be formed more flexibly by setting the sum of the widths (W4) and (W5) to be narrower than the width (W1), and, on the contrary, the abutting part 34e can be made more rigidly by setting the sum of the widths (W4) and (W5) to be wider than the width (W1). As a result, the urging force of the urging member 34 can be changed without changing the abutting length or area of the width (W2). As described above, setting of the urging force can be changed according to use or requirement for the motor, for example, a size or a rotation number of the motor 21, while the abutting width (W2) of the abutting part 34e of the urging piece 34c is secured widely. Accordingly, the urging member 34 with a high degree of versatility can be manufactured.

In the structure described above, the abutting part 34e of the urging piece 34c abuts with the pressurization face 33c at an outer side portion apart from the recessed part 33e of the bearing 33 so as to avoid the center (rotation center of the rotor shaft 23) of the pressurization face 33c.

Therefore, even when the molding material injection gate trace (projection) 33d is located in the recessed part 33e, the urging piece 34c is prevented from abutting with the molding material injection gate trace 33d. Moreover, the tip end of the molding material injection gate trace 33d does not protrude from the pressurization face 33c without performing an additional work of deburring. Therefore, the urging piece 34c can be further securely prevented from abutting with the molding material injection gate trace 33d.

According to the embodiment of the present invention, even when a dimensional error is occurred between an inner diameter of the bearing hole 32a and an outer diameter of the bearing 33 by thermal shrinkage at the time of molding and/or hardening because the bearing 33 is made of resin and, as a result, a gap space between the bearing 33 and the bearing hole 32a is occurred such that the bearing 33 is inclined in the inside of the bearing hole 32a, the abutting part 34e is abutted with the pressurization face 33c on an outer side apart from the recessed part 33e and thus the bearing 33 can be maintained in an inclined state in the bearing hole 32a. Accordingly, occurrence of unusual noise due to rattling of the bearing 33 in the bearing hole 32a is prevented.

In this case, the support recessed part 33b is formed in the bearing 33 and one end of the rotor shaft 23 is formed as a supported face in a spherical face shape which engages with the support recessed part 33b. Further, since a bottom face of the support recessed part 33b is formed in a conical shape, a rotation center (axial line) of the rotor shaft 23 does not shift or does not fluctuate.

As described above, in the motor 21 in accordance with an embodiment of the present invention, when the bearing 33 is molded in a substantially cylindrical shape with resin, the bearing 33 can be obtained with a high degree of circularity by supplying resin material from the center position of the bearing 33. Further, the molding material injection gate trace 33d which has been left at the center position of the bearing 33 is located on the inner side in a thickness direction from the pressurization face 33c by providing the recessed part 33e and therefore, the molding material injection gate trace (projection) 33d does not abut with the urging piece 34c even when the abutting part 34e of the urging member 34 is abutted with the pressurization face 33c. Further, since the opening part 34d of the urging piece 34c is formed to face the material injection gate trace 33d, even when the bearing 33 has excessively moved closer to the plate body 34a side of the urging member 34 accidentally, the molding material injection gate trace 33d does not abut with the urging piece 34c.

In accordance with an embodiment, the opening part 34d enables the urging piece 34c to be formed in a circular ring shape or its similar shape and thus, even when a width of the urging piece 34c, especially the width (W2) of the abutting part 34e is formed to be wider, an urging force of the urging piece 34c can be prevented from being made extremely larger.

In addition, for example, unevenness (deflection) of the resin material which is occurred when the bearing 33 is molded is eliminated by structuring the bearing 33 and the urging member 34 as described above and thus the bearing 33 with a high degree of circularity is obtained. Therefore, since the bearing 33 is stably held in the bearing holder 32, the rotor shaft 23 is stably rotated and a clearance between the bearing holder 32 and the bearing 33 can be made smaller. Accordingly, the bearing 33 is difficult to be inclined or slanted in the bearing holder 32 and thus the rotor shaft 23 can be further stably rotated.

In the motor 21 in accordance with the embodiment of the present invention, the urging piece 34c is used as an elastic tongue piece which is cut and bent. However, the urging piece 13b shown in FIG. 10 may be used instead of the urging piece 34c. Further, the plate body 34a may be formed in a flat plate without providing with the urging piece 34c and another urging member such as a coil spring may be disposed between the pressurization face 33c of the bearing 33 and the plate body 34a so as to surround the recessed part 33e.

Further, in accordance with the above-mentioned embodiment, the present invention is applied to a stepping motor but the present invention may be applied to another type of motor. In addition, the present invention may be applied to whole structures in which pressurization is applied to a resin product in a circular shape by a spring or the like. In this case, resin material to be used is not limited to the above-mentioned examples of the resin material.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor having a rotor shaft to which a permanent magnet is fixed;
   a stator which is formed with a rotor insertion hole into which the rotor is inserted;
   a bearing holder which is fixed to one end of the stator and is formed with a bearing hole;
   a bearing made of resin which is provided in the bearing hole for rotatably supporting one end part of the rotor shaft; and
   an urging member which is attached to the bearing holder and abutted with a pressurization face of the bearing opposite to a rotor shaft support face of the bearing to urge the bearing toward a side of the rotor shaft;
   wherein a molding material injection gate trace which has been used when the bearing is resin-molded is positioned at a center portion of the pressurization face;
   the bearing comprises a recessed part which is formed at a roughly center position of the pressurization face;
   the urging member comprises:
      a disk-shaped plate body; and
      an urging piece cut from a center portion of the disk-shaped plate body, the urging piece comprising:
         a ring-shaped part; and
         a root part connected to the disk-shaped plate body and to an edge of the ring-shaped part;
      wherein the ring-shaped part comprises an abutting part at a portion opposite of where the root part connects to the ring-shaped part;
      the abutting part is abutted with the pressurization face at a portion apart from the recessed part and an abutting width of the abutting part is a width of the abutting part abutted with the pressurization face;
      the ring-shaped part comprises an opening part formed between the root part and the abutting part;
      the opening part is formed to face the molding material injection gate trace and an abutting width of the abutting part is set to be wider than a width of the root part; and
      a width of the ring-shaped part minus a width of the opening part is equal to the width of the root part.

2. The motor according to claim 1, wherein the molding material injection gate trace is positioned in the recessed part.

3. The motor according to claim 2, wherein a depth of the recessed part is set to be in a dimension so that a tip end of the molding material injection gate trace does not protrude from the pressurization face.

4. The motor according to claim 1, wherein the ring-shaped part is bent such that the abutting part abuts with the pressurization face in a line contact manner.

5. The motor according to claim 1, further comprising a spherical supported face which is provided at an end part of the rotor shaft, and
   a support recessed part which is formed in the rotor shaft support face of the bearing for engaging with the spherical supported face of the rotor shaft.

6. The motor according to claim 1, wherein the molding material injection gate trace is positioned in the recessed part.

7. The motor according to claim 6, wherein a depth of the recessed part is set to be in a dimension of that a tip end of the molding material injection gate trace does not protrude from the pressurization face.

8. The motor according to claim 1, further comprising a spherical shaped supported face which is provided in the one end part of the rotor shaft, and
   a support recessed part which is formed in the rotor shaft support face of the bearing for engaging with the spherical shaped supported face.

9. A motor comprising:
   a rotor having a rotor shaft to which a permanent magnet is fixed;
   a stator which is formed with a rotor insertion hole into which the rotor is inserted;
   a bearing holder which is fixed to one end of the stator and is formed with a bearing hole;
   a bearing made of resin which is provided in the bearing hole for rotatably supporting one end part of the rotor shaft; and
   an urging member which is attached to the bearing holder and abutted with a pressurization face of the bearing opposite to a rotor shaft support face of the bearing to urge the bearing toward a side of the rotor shaft;
   wherein a molding material injection gate trace which has been used when the bearing is resin-molded is positioned at a center portion of the pressurization face;
   the bearing comprises a recessed part which is formed at a roughly center position of the pressurization face;
   the urging member comprises:
      a disk-shaped plate body; and
      an urging piece cut from a center portion of the disk-shaped plate body, the urging piece comprising:
         a ring-shaped part; and
         a root part connected to the disk-shaped plate body and to an edge of the ring-shaped part;

wherein the ring-shaped part comprises an abutting part at a portion opposite of where the root part connects to the ring-shaped part;

the abutting part is abutted with the pressurization face at a portion apart from the recessed part and an abutting width of the abutting part is a width of the abutting part abutted with the pressurization face;

the ring-shaped part comprises an opening part formed between the root part and the abutting part;

the opening part is formed to face the molding material injection gate trace and an abutting width of the abutting part is set to be wider than a width of the root part; and the urging piece is structured such that a width of the ring-shaped part minus the opening width is narrower than the width of the root part.

10. A motor comprising:

a rotor having a rotor shaft to which a permanent magnet is fixed;

a stator which is formed with a rotor insertion hole into which the rotor is inserted;

a bearing holder which is fixed to one end of the stator and is formed with a bearing hole;

a bearing made of resin which is provided in the bearing hole for rotatably supporting one end part of the rotor shaft; and an urging member which is attached to the bearing holder and abutted with a pressurization face of the bearing opposite to a rotor shaft support face of the bearing to urge the bearing toward a side of the rotor shaft;

wherein a molding material injection gate trace which has been used when the bearing is resin-molded is positioned at a center portion of the pressurization face;

the bearing comprises a recessed part which is formed at a roughly center position of the pressurization face;

the urging member comprises:
  a disk-shaped plate body; and
  an urging piece cut from a center portion of the disk-shaped plate body, the urging piece comprising:
    a ring-shaped part; and
    a root part connected to the disk-shaped plate body and to an edge of the ring-shaped part;

wherein the ring-shaped part comprises an abutting part at a portion opposite of where the root part connects to the ring-shaped part;

the abutting part is abutted with the pressurization face at a portion apart from the recessed part and an abutting width of the abutting part is a width of the abutting part abutted with the pressurization face;

the ring-shaped part comprises an opening part formed between the root part and the abutting part;

the opening part is formed to face the molding material injection gate trace and an abutting width of the abutting part is set to be wider than a width of the root part; and the urging piece is structured such that a width of the ring-shaped part minus the opening width is wider than the width of the root part.

* * * * *